US005163077A

United States Patent [19]

Dupre et al.

[11] Patent Number: 5,163,077

[45] Date of Patent: Nov. 10, 1992

[54] DEVICE FOR THE COUNTING OF CHIP CARDS CONTAINED IN A BATCH

[75] Inventors: Francois Dupre, Aubagne; Alain Jutard, Genay; Hervé Redarce, Lyons; Maurice Betemps, Villeurbanne, all of France

[73] Assignee: Gemplus Card International, Aix en Provence, France

[21] Appl. No.: 735,289

[22] Filed: Jul. 24, 1991

[30] Foreign Application Priority Data

Jul. 30, 1990 [FR] France ............................ 90 09696

[51] Int. Cl.[5] .......................................... G01N 23/06

[52] U.S. Cl. ...................................... 378/51; 378/99

[58] Field of Search ................................ 378/51, 99

[56] References Cited

U.S. PATENT DOCUMENTS 4,163,991 8/1979 Burrig ............................. 358/111

FOREIGN PATENT DOCUMENTS 0371881 11/1989 European Pat. Off. .

63-32677 2/1988 Japan .

1-321593 12/1990 Japan .

*Primary Examiner*—Craig E. Church

*Attorney, Agent, or Firm*—Roland Plottel

[57] ABSTRACT

In order to count chip cards when they are manufactured, it is chosen to present these chip cards in lots, edgewise, in the field of an X-radiation. A measurement is made of the differential image of attenuation of the X-radiation due to the passage of this X-radiation, on the one hand through the plastic card structure, which is relatively transparent to the X-radiation, and on the other hand through the metallic connection parts of the chips. In the radiological absorption image obtained, a count is made of the number of transitions of the absorption signal. It is shown that the reliability of the counting is greatly improved, as is the security of manipulation.

7 Claims, 1 Drawing Sheet

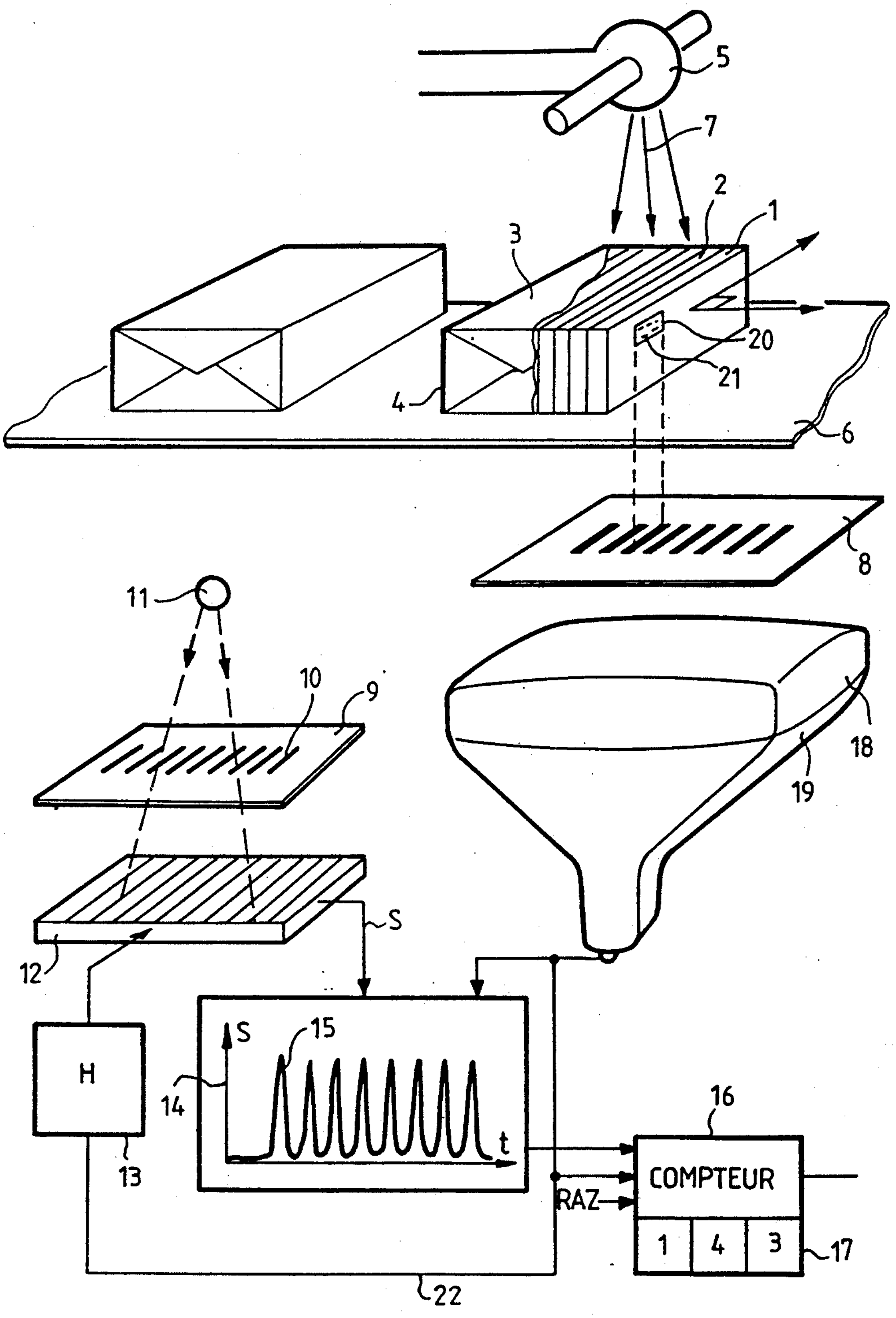
5
7
2
1
3
20
21
4
6
8
11
10
9
18
19
S
12
H
13
S
15
t
14
16
COMPTEUR
RAZ
1
4
3
17
22

DEVICE FOR THE COUNTING OF CHIP CARDS CONTAINED IN A BATCH

BACKGROUND OF THE INVENTION

1. Field of the Invention

An object of the present invention is a device for the counting of chip cards, or also memory cards, contained in a batch, or preferably even contained in a sealed box. It can be applied more particularly in the field of computerised money systems. Its main advantage is that it increases the security of the counting operation, during the manufacture and distribution of the cards, as regards both the precision of the number of cards counted and the handling of the cards in this batch.

In most chip card applications, the cards represent either a direct monetary value (as with prepaid cards such as telephone cards for example) or a substantial transactional capacity (as with bank or access type cards). In all uses, the chip cards provide additional security in the applications to which they are related. One of the key factors in guaranteeing this security, during the manufacture of the cards, is the precise counting of the number of cards, good as well as defective, that have been manufactured. This counting is done at each step of manufacture, especially at the encoding of the cards, when they assume their value, and especially also when these cards are dispatched from the manufacture to the user.

The following constraints of security have to be met for the counting operation. Firstly, it is necessary to obtain a counting error rate that is ideally zero and should, in practice, be better than one in a million. Besides, the counting should be reliable, i.e. it should not, in itself, introduce risks of error during the handling operations which may depend on the counting operator. Indeed, there is always a risk of fraud when human operators have to handle the cards in a manufacturing system. Finally, the counting should be fast so that it can be done at the end of each of the manufacturing steps and on the entire manufactured batch, without concerning only one sampled part. The number of cards manufactured in one manufacturing unit may be of the order of several millions per month, and it can be said that they have to be counted at least three times during the manufacturing cycle. The problems entailed by this operation can therefore be imagined.

2. Description of the Prior Art

The existing systems used to count cards are, firstly, manual type systems and, secondly, optical type systems. With manual counting, the error rate is very high: it is in the range of one per thousand to one per ten thousand. Besides, these manual counting operations are very slow and have the obvious drawback of requiring action by an operator. Optical methods also include the known one in which cards are counted as they individually flow past a photoelectric cell. This counting can be used to obtain error rates only of the order of one per hundred thousand to one per million. This precision is far greater than the earlier one, but this technique does not remove risks of error or fraud when the cards are being unpacked or returned to their boxes (after the counting). This unpacking is necessary to set up a certain distance between the cards.

Besides, another optical type of method envisages the counting of the cards in the boxes that contain them. In effect, in a batch of cards placed flat against one another in a box, a variation can be observed in the transmission of light. This phenomenon is caused by the edges of the different cards that are placed side by side with another. This variation in light can be detected by a counter connected to an optical sensor placed on the other side of the batch. In this approach that uses transmission, the manufacture of the card structure of the cards should be of the co-laminated type. It may be recalled that, to manufacture a co-laminated card structure, different layers of plastic film are used, stacked one on top of the other until the overall thickness is equal to that desired. The layers are not all of the same type. Firstly, some of them have a perforation designed to constitute a cavity, with the others, to receive the integrated circuit of the chip card and, secondly, in order to facilitate the counting process, some of these layers are made of a material transparent to light radiation, preferably to ultraviolet radiation. It is then enough to present a card such as this, on its edge, before an ultraviolet radiation to allow a thin beam of light, that has crossed the transparent layer, to appear. If one batch of cards includes cards stacked one against the other, then counting the number of light beams that go through the batch is sufficient to obtain the number of cards contained in this batch.

The latter technique, however, has the following drawbacks. Firstly, the adjusting of the light detection operations and of the way in which the cards are presented is delicate and unstable. Secondly, since the boxes that contain the batches of cards are not closed (as the light radiation has to go through them), the risk of fraud is not eliminated. Finally, and above all, this technique can be used only with cards of the co-laminated type, and cannot be used with moulded cards. Now, a majority of cards are presently manufactured by the moulding technique for reasons of manufacturing convenience. The moulding material is generally polyvinyl chloride. It may also be ABS.

SUMMARY OF THE INVENTION

An object of the invention is to overcome these drawbacks in counting by proposing a technique in which the cards are kept on edge. Thus, rather than a direct optical reading, an indirect optical reading is done. In one variant, rather than the cards of the batch, it is the number of electronic micromodules of the batch that are counted, which amounts to the same thing. More precisely, it is even the number of contact metallisations of the electronic micromodules of the cards of this batch that is counted. To this end, the batch of cards is subjected to X-radiation. The X-radiation is naturally capable of going through the cards, whatever the plastic material of which they are made. As a consequence, the method of the invention can be applied to every type of card-manufacturing technology. By contrast, the X-radiation is more absorbed by the chip, the electronic micromodule that essentially includes silicon and metal contact plates having a radiological absorption that is different from that of plastic materials.

To do the counting, then, an image of the phenomenon of absorption of the X-radiation in the batch of cards is made and, in this image, a count is taken of the number of events of greater opacification resulting from the passage of the X-radiation through the micromodules. The measurement of thickness of material by X-radiation is already known. However, this measurement makes it necessary to carry out a calibration of the absorption of the radiation in a predetermined thickness of a material and to subsequently measure, in a similar way, the thickness of a material crossed in comparison with the calibrated value. However, there is no question of this type of measurement herein, where it is the transitions of the opacification signal that are counted and not, ultimately, its intrinsic value. To this end, the cards are presented edgewise to the X-radiation.

With the method of the invention, results better one to ten million are obtained: this means that the errors may be considered to be zero for one month's output. It is worth noting that the invention enables the batch of cards to be kept in its packaging when the counting is done: this considerably limits the risks of fraud. It suffices then to choose a packaging that is transparent to X-rays or to light. Any box made of PVC, for example, may be appropriate.

Thus, in view of the elimination of the manual operations for the preparation of the counting operation, it is even possible to obtain a certification of the number of cards counted: the number of these cards may be printed indelibly on the packaging. This printing may be automatic, and may be done by the image processing machine that does the counting. The system of the invention can therefore enable the greater automation of the manufacturing process.

An object of the invention, therefore, is a device for the counting of the memory cards of a batch, wherein said device comprises:

- a transmitter to transmit an X-radiation;
- means to present the cards of the batch substantially edgewise with respect to the X-radiation emitted,
- an X-radiation detector placed downline from the batch of cards with respect to this radiation and capable of producing a radiological image of the radiation emitted after it has passed through the batch of the cards, and
- a counter to make a count, in the image produced, of a number of alterations of this image, this number representing the number of the cards in the batch.

BRIEF DESCRIPTION OF THE DRAWING

The invention shall be understood more clearly from the following description and from the appended drawing. This drawing is given purely by way of indication and in no way restrict the scope of the invention.

MORE DETAILED DESCRIPTION

The single FIGURE 1 shows a variant of a device, according to the invention, for the counting of memory cards such as 1 or 2, contained in a batch of cards 3. The cards and 2 are plane, and are generally rectangular. They have a micromodule 20 inserted into the card structure. This micromodule is provided with electrical contact metallizations 21. In a preferred way, the batch 3 of cards is kept in a package 4 that is sealed so that an operator cannot handle the cards contained in the batch. In a preferred way, again, the cards are attached to one another by their plane faces. The device has a transmitter 5 of X-radiation 7. The batches of cards, such as the batch 3, are placed in the X-radiation field, on a conveyor band 6 made of a material transparent to X-radiation. The batches 3 are placed on the band 6 in such a way that the plane of the cards 1 or 2 is substantially parallel to the main direction of the X-radiation 7 of the tube 5. In practice, it has been observed that it is important for the cards to be vertical but that the device is relatively tolerant in this respect. Thus, if the X-ray tube 5 of the batch 3 is moved away from the batch 3 by only 75 cm to 1 meter, this is enough, with a batch of about one hundred cards, for the X-radiation for be considered to be a sufficiently splitting type of parallel radiation. About a hundred cards mean a batch thickness of the order of 8 cm., i.e. a deviation of the order of 10% between the batch and the X-ray source. Besides, given the fineness of the connection metal parts of the micromodule, the absorption images of the micromodules can be easily separated from one another. The device also includes an X-ray detector beneath the conveyor band 6. This X-ray detector is constituted, in one example, by an X-ray sensitive film 8, the photographic printing of which is done by an X-ray pulse emitted by the tube 5.

After the development of the image thus obtained, there is observed, on the shot 9, a set of opacification lines such as the line 10. These lines, by their presence, express the number of cards such as 1. For the counting, a known type of technique is then used. An ultraviolet radiation source 11 (or another type of visible optical radiation) illuminates the shot 9 before which a camera 12 is placed. In a simple example, the camera 12 is constituted by an array 12 of CCD type cells. This array 12 is connected to a control circuit 13 including essentially a clock H capable of prompting the conveyance of the charges contained in each of the cells to the neighbouring cells. The last cell is connected to a signal output of the device.

In other words, once the pulsed illumination of the array 12 has been done through the shot 9, electrical charges are stored in the different cells of this array. It is possible to read the electrical charges that are charged in each of the cells under the control of the circuit 13. The array 12 then delivers a signal S 14, the temporal representation of which, at the clock rate H, takes the form of a pulse sequence 15. Depending on whether the nature of the shot is positive or negative, a count will be made of the peaks of the signal S or of the times when it passes by zero. The signal S is introduced, possibly after shaping filtrations, into a logic counter 16. The counter 16 has a zero-setting counter RAZ. The counter 16 may also have a device 17 for the display of the quantities counted.

The invention works as follows. A batch of cards is placed in its package 4 on the band 6. The cards are edgewise on the band 6 and, preferably, the faces of these cards are oriented perpendicularly to the big length of the band 6. With the band 6, the batch 3 is shifted so that it is placed between the tube 5 and the film 8. When this place has been reached, the tape is stopped and the batch 3 is irradiated by means of the tube 5. Then the film 8 is developed to obtain the shot 9. By positioning the shot 9 between the lamp 11 and the array 12, a count is made of the number of transitions of opacity presented in the reading signal S of the array 12. This system also makes it possible, after counting, to associate the shot 9 with the batch or packet 3.

As a variant, to carry out the counting, it may be preferred to use a radiological image intensifier screen 18 coupled with a television camera 19. In this case, the screen 18/camera 19 pair is placed beneath the conveyer band 6 at the position in which the film 8 had been placed. The screen 18 of the radiological image intensifier screen is capable of converting the X-radiation received into a light radiation. Such envelopes or screens 18 have long been known and used in medicine. An envelope such as this essentially includes caesium iodide crystals capable of carrying out this conversion of X-rays into visible light. The television camera 19 reads the converted image through the screen 18 and delivers a video signal that can be likened in every point to the signal 14 delivered by the array 12. The counting referred to here above can be done directly on the video signal.

The counter 16 is synchronised either with the camera 19 or with the circuit 13 for the control of the array 12. To this end, a synchronisation link 22 connects the circuit 13, or the camera 19, to the counter 16. In another variant, it is possible to carry out a measurement in motion, with the batch 3 filing past, without stopping, between the X-ray tube 5 and the detector 18–19. In this case, the camera 19 may be connected to an image memory. The reading of the image memory then gives the signal S.

What is claimed is:

1. A device for the counting of the chip cards of a batch, comprising;

sealed boxes in which the chip cards of the batch are placed, a transmitter to transmit an X-radiation onto said chip cards, an X-radiation detector placed downline from the batch of chip cards with respect to this radiation and capable of producing a radiological image of the radiation emitted after it has passed through said chip cards of the batch, and a counter to make a count, in the image produced, of a number of alterations of this image, said alterations representing absorption variations of said X-radiation within said chip cards with regard to the absorption in said bodies of said chip cards, this number thus representing the number of the cards in the batch.

means to present the cards of the batch in sealed boxes, substantially edgewise with respect to the X-radiation emitted, these cards being placed against each other by their plane faces.

2. A device according to claim 1, wherein the radiation detector has a radiosensitive film, and wherein the counter has a camera to record an image of the film, the output signal of said camera being connected to a logic counter to count a number of transitions of this output signal.

3. A device according to claim 1 wherein said chip cards have micromodule chips and the metallic contacts on a surface of the card, and said X-radiation transmitted onto said chip card is directed in the region of said micromodule chip and/or metallic connection, whereby said detector detects said image largely based upon absorption of said X-radiation by said micromodule chip and/or said metallic connection.

4. A device according to claim 1, wherein the radiation detector includes a TV type camera, the output signal of which is connected to a logic counter to count a number of transitions of this output signal.

5. A device according to claim 4, wherein the radiation detector has a radiological image intensifier upline of the camera.

6. An apparatus for counting the number of chip cards in a sealed package, wherein said chip cards are stacked with a major plane face adjacent to each other comprising, means for moving the sealed package of cards past a first station with said major plane face of each of the cards, being oriented in a first direction, an X-radiation source means for generating X-radiation in said first direction through said chip cards at said first location;

an X-radiation detector adopted to receive said X-radiation after it has passed through said chip cards of sealed package, and for producing a radiological image of the radiation received after it has passed through said chip cards, a counter means for counting from said image produced, the number of alterations of said image of said package of cards, said alterations representing the number of the cards in the package.

7. An apparatus according to claim 6, wherein said radiation detector has radiosensitive film, and wherein said counter has a camera to record an image of the film, said camera providing an output signal in accordance therewith, further comprising a counter connected to an output of said camera for counting the signal from said camera.

* * * * *